(12) United States Patent
Nguyen

(10) Patent No.: US 8,016,544 B1
(45) Date of Patent: Sep. 13, 2011

(54) VERTICAL WINDMILL

(76) Inventor: Huy T. Nguyen, Roanoke, VA (US)

( * ) Notice: Subject to any disclaimer, the term of this patent is extended or adjusted under 35 U.S.C. 154(b) by 81 days.

(21) Appl. No.: 12/659,412

(22) Filed: Mar. 8, 2010

(51) Int. Cl.
*F03D 1/06* (2006.01)

(52) U.S. Cl. .............. 415/60; 415/4.2; 415/4.4; 415/65; 415/130; 415/907; 416/17; 416/23; 416/119; 416/132 B; 416/205

(58) Field of Classification Search ............... 415/4.2, 415/4.4, 60, 61, 65, 68, 130, 907; 416/17, 416/23, 111, 119, 132 B, 205
See application file for complete search history.

(56) References Cited

U.S. PATENT DOCUMENTS

| | | | |
|---|---|---|---|
| 3,920,354 A | 11/1975 | Decker | |
| 4,113,408 A | 9/1978 | Wurtz et al. | |
| 4,134,710 A * | 1/1979 | Atherton | 416/117 |
| 5,256,034 A | 10/1993 | Sultzbaugh | |
| 5,525,037 A * | 6/1996 | Cummings | 416/117 |
| 6,734,576 B2 * | 5/2004 | Pacheco | 290/55 |
| 6,857,846 B2 | 2/2005 | Miller | |
| 7,083,382 B2 * | 8/2006 | Ursua | 416/110 |
| 2003/0235498 A1 | 12/2003 | Boatner | |
| 2009/0035134 A1 | 2/2009 | Kuo et al. | |
| 2009/0074577 A1 | 3/2009 | Semov | |

* cited by examiner

*Primary Examiner* — Igor Kershteyn
(74) *Attorney, Agent, or Firm* — Richard C. Litman

(57) ABSTRACT

The vertical windmill includes a rotatable wind wheel column mounted to a base. The column includes a plurality of hollow wheel hubs stacked vertically atop each other. Each wheel hub includes a plurality of radiating mounting arms equidistantly spaced around the axis of the wheel hub such that the arms of an adjacent hub are angularly offset with respect to the other. A plurality of mounting assemblies is disposed on each of the mounting arms for mounting an array of wing blades. Each alternate stacked wheel hub and mounting arms together forms a wind wheel with vertically oriented wing blades mounted between upper and lower spaced arms such that the top wheel is interconnected with the lower wheel at a height less than the height of the blades. Each array of blades may freely rotate or be positively rotated to orient the blades for optimum usage of wind power in rotating the column.

15 Claims, 7 Drawing Sheets

VERTICAL WINDMILL

BACKGROUND OF THE INVENTION

1. Field of the Invention

The present invention relates to alternative energy generating devices, and more specifically to a vertical windmill for maximizing conversion of wind energy into usable energy.

2. Description of the Related Art

Due to the ever-increasing energy demands and the negative environmental impact of fossil and nuclear fuels, pursuit of green alternatives have become a prominent concern worldwide. The supply of fossil fuels dwindles annually, and they produce tons of hazardous chemicals dangerous to dispose of without strict regulation. Nuclear reactors produce radioactive wastes that take decades before the radioactivity diminishes to safe levels. Moreover, it is difficult to find safe landfill real estate that does not encroach on livable land.

With the above concerns in mind, many different alternative methods for generating usable energy have been pursued utilizing the power of the elements such as solar, water and wind. One of the solutions resides in windmills that convert wind energy to electricity. Conventional windmills have been employed to mill grains or pump water. However, the current advances in aerodynamics, materials and computers have resulted in arrays of windmills installed in ideal windy locales where the rotation of the windmill can be used to generate electricity.

A typical windmill generator comprises a fan mounted to a generator pod atop an elongate pole. The fan usually includes a plurality of blades radiating from a horizontally disposed shaft similar to an aircraft propeller engine. These blades are relatively long, made from metal and aerodynamically shaped to maximize rotation of the fan, i.e., the blades are designed to rotate with minimal force from the wind. However, this particular configuration still does not maximize conversion of wind power to rotary force due to the weight of the blades despite the advantages of the aerodynamic design. In other words, the typical windmill generator may not be able to convert the wind power from any given wind velocity with maximal efficiency because some will be lost in overcoming the mass and friction of the blades. Moreover, it may be difficult to widely employ the typical windmill generator due to the lack of ideal windy locales and/or the size. In light of the above, it would be a benefit in the art of alternative energy generators to provide a device that can maximize conversion of wind power to usable energy in a wide variety of locales.

Thus, a vertical windmill solving the aforementioned problems is desired.

SUMMARY OF THE INVENTION

The vertical windmill includes a rotatable wind wheel column mounted to a base. The column includes a plurality of hollow wheel hubs stacked vertically atop each other. Each wheel hub includes a plurality of radiating mounting arms equidistantly spaced around the axis of the wheel hub so that the arms of an adjacent hub are angularly offset with respect to the other. A plurality of mounting assemblies is disposed on each of the mounting arms for mounting an array of wing blades. Each alternate stacked wheel hub and corresponding mounting arms together forms a wind wheel with vertically oriented wing blades mounted between upper and lower spaced arms so that the top wheel is interconnected with the lower wheel at a height less than the height of the blades. Each array of blades may freely rotate or be positively rotated to orient the blades for optimum usage of wind power in rotating the column.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
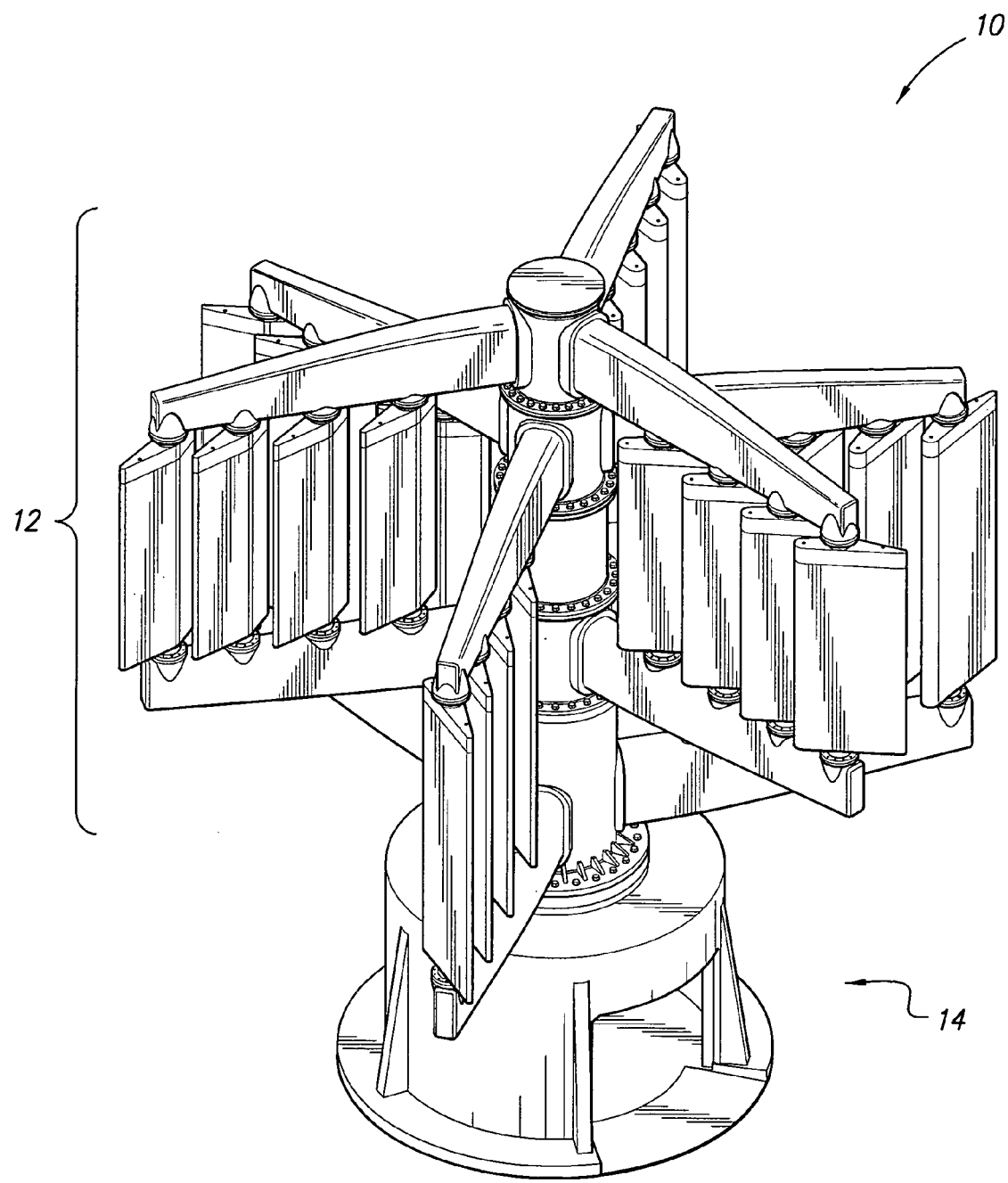
FIG. 1 is a perspective view of a vertical windmill according to the present invention.
Figure 2:
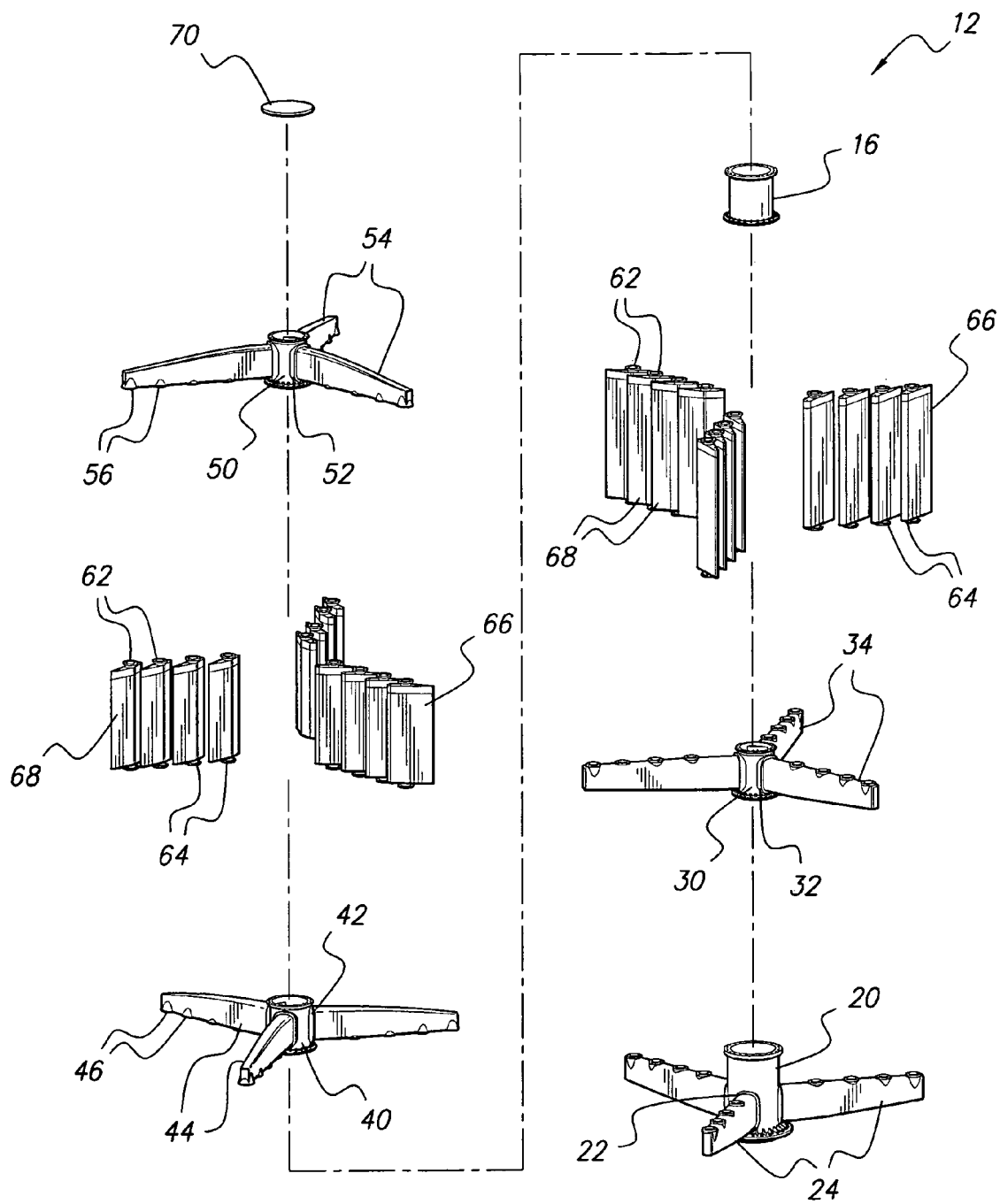
FIG. 2 is an exploded view of the vertical windmill according to the present invention.

The present invention relates to a vertical windmill, generally referred to in the drawings by reference number 10, for maximal conversion of wind power into rotary force for producing usable energy. As shown in FIGS. 1 and 2, the vertical windmill 10 includes a rotatable wind wheel column 12 mounted to a base 14. The wind wheel column 12 includes a plurality of vertically stacked wind wheels angularly offset or staggered from each other. A plurality of vertically disposed vanes, wings or blades 60 mounted to the wind wheels utilizes wind power to provide the motive force for rotating the wind wheel column 12.

As shown in FIG. 2, the wind wheel column 12 includes, from the bottom, a lower or first hub 20 with angularly spaced mounting holes 24. The first hub 20 may be a substantially hollow cylinder with connection flanges disposed on the top and bottom to facilitate mounting thereof to subsequent hubs or hub sections and the base 14. Since the first hub 20 forms a base or foundation for the wind wheel column 12, it is preferable; that first hub 20 be larger than the hubs stacked thereon. Alternatively, the hubs may be of uniform size. A plurality of lower or first mounting arms or spokes 24 may be mounted to respective mounting holes 24 so as to radiate therefrom. Each first mounting arm 24 includes a plurality of mounting assemblies 82 for rotatably mounting one end of a respective wing blade 60.

A second hub 30 with mounting holes 32 is stacked atop the first hub 20 via fasteners. The second hub 30 is similarly constructed as the first hub 20 but of slightly smaller dimensions. A plurality of radiating second mounting arms or spokes 34 extend from the respective mounting holes 32 and includes a plurality of mounting assemblies 82 for rotatably mounting one end of a respective wing blade 60. Unlike the first hub 20, the second mounting arms 34 are angularly offset or staggered with respect to the first mounting arms 24 so that the second mounting arms 34 are disposed between the first mounting arms 24 when viewed from above. An intermediate spacer hub 16 is disposed atop the second hub 30 to provide the correct spacing in the stacked arrangement of hubs.

A third hub 40 with mounting holes 42 is stacked atop the intermediate hub 16. The third hub 40 is similarly constructed as the second hub 30 but of slightly smaller dimensions. A plurality of radiating third mounting arms or spokes 44 extend from the respective mounting holes 42 and includes a plurality of mounting assemblies 46 for rotatably mounting the other end of a respective wing blade 60. The third mounting arms 44 are vertically aligned with the first mounting arms 24 when assembled.

A top or fourth hub 50 with mounting holes 42 is stacked atop the third hub 40. The fourth hub 50 is similarly constructed as the third hub 40 but of slightly smaller dimensions. A plurality of radiating fourth mounting arms or spokes 54 extend from the respective mounting holes 52 and includes a plurality of mounting assemblies 56 for rotatably mounting the other end of a respective wing blade 60. The fourth mounting arms 54 are vertically aligned with the second mounting arms 34 when assembled. A cap 70 may close the top, open end of the fourth hub 50.

To form a wind wheel, each pair of aligned mounting arms in alternate stacked hubs define upper and lower supports for mounting an array or set of wing blades 60. For example, the third mounting arms 44 and the first mounting arms 24 respectively define upper and lower supports for the first or lower wind wheel. Correspondingly, the fourth mounting arms 54 and the second mounting arms 34 respectively define upper and lower supports for the second or top wind wheel. Due to this stacked arrangement of hubs 16, 20, 30, 40, 50, the top wind wheel is interconnected to the lower wind wheel at a height less than the height of the blades 60. Moreover, the angular offset of the arms 24, 34, 44, 54 and the staggered wheel stack reduces the height and the overall size without sacrificing the rotational capabilities for generating energy in the vertical windmill 10.

In the exemplary embodiment, the blades 60 may be an elongate wing foil having a flat side 66 and a curved side 68. This aerodynamic configuration produces the desired high and low pressure zones that permit travel through air with minimal drag. One end of the blade 60 includes an upper or top mounting assembly 62 adapted to be rotatably connected to an upper mounting arm while the other end includes a lower or bottom mounting assembly 64 adapted to be rotatably connected to a lower mounting arm. Both mounting assemblies 62, 64 may be female adapters. To ease installation of the blade 60, the top mounting assembly 62 may be depressed a limited distance to provide additional clearance. Of course similar functionality may be included in the bottom mounting assembly 64. To minimize weight, it is preferable that the blade 60 be made of fiberglass, carbon fiber or other strong lightweight materials. Due to the number of blades 60 in the vertical windmill 10, these present a relatively larger surface area for the wind to act upon compared to conventional windmill generators.

Figure 7:
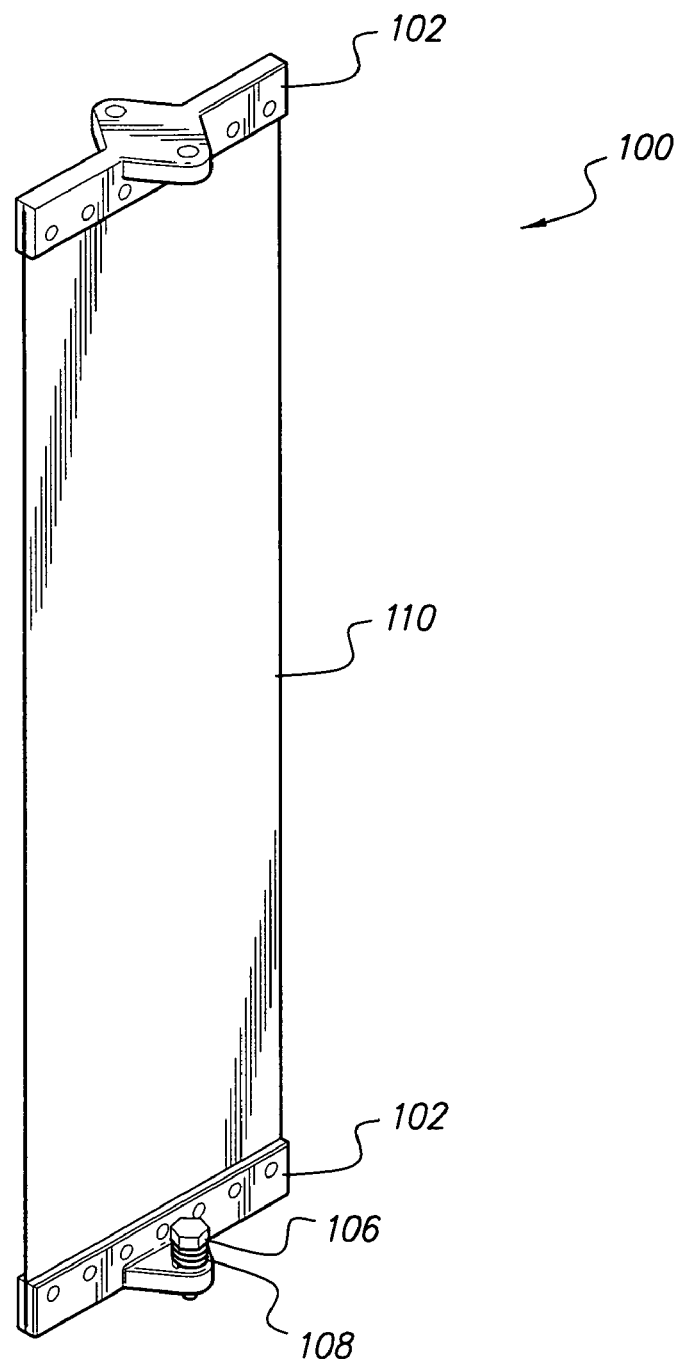
FIG. 7 is a perspective view of an alternate blade for a vertical windmill according to the present invention.

An alternative wing blade 100 is shown in FIG. 7. In this embodiment, the wing blade 100 includes a flexible yet torsion resistant airfoil strip 110 mounted between opposing mounting brackets 102, 104. The mounting brackets 102, 104 can be straight or curved resulting in a straight or curved airfoil strip 110 to accommodate the desired aerodynamic characteristics. The airfoil strip 110 may be made from steel, aluminum, plastics, composites or combination thereof so long as it exhibits torsion resistance and limited flex. Each bracket 102, 104 may be attached to a corresponding mounting arm via fasteners 106 biased by a spring 108. This blade 100 is lighter in weight with similar performance as the blade 60.

Figure 3:
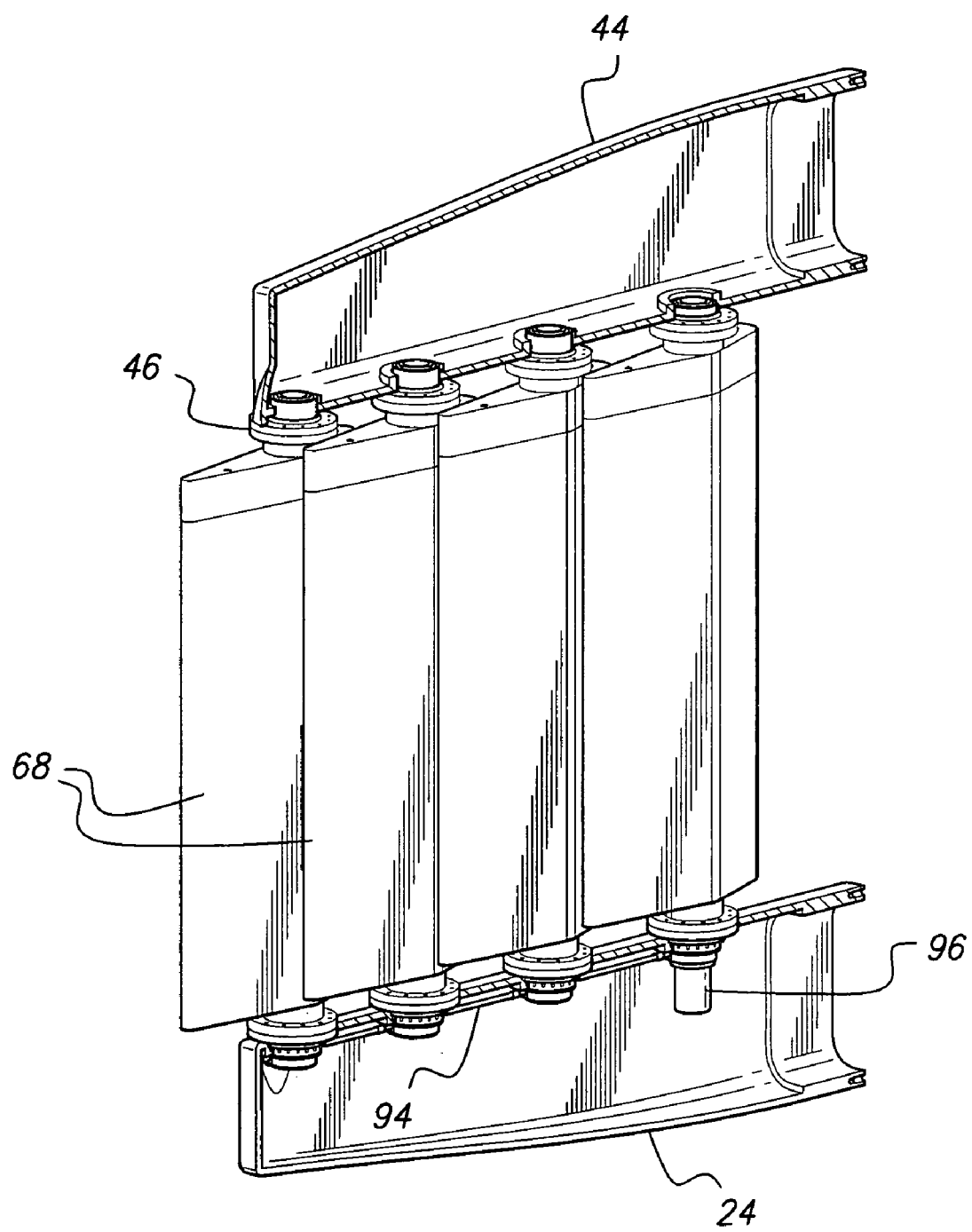
FIG. 3 is a partial perspective view in section of a mounted array of blades in the vertical windmill according to the present invention.
Figure 4:
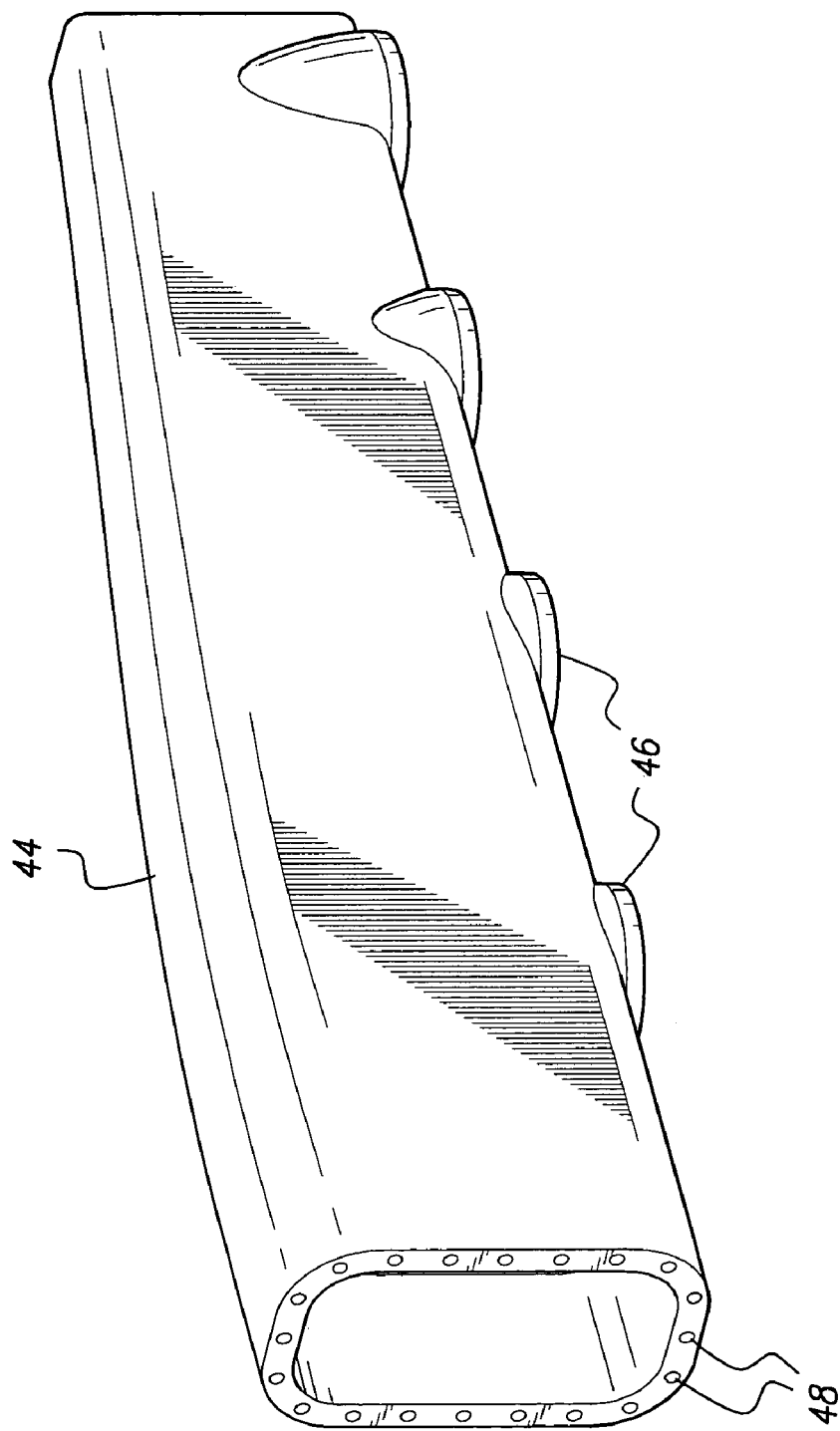
FIG. 4 is a perspective view of an upper mounting arm in the vertical windmill according to the present invention.
Figure 5:
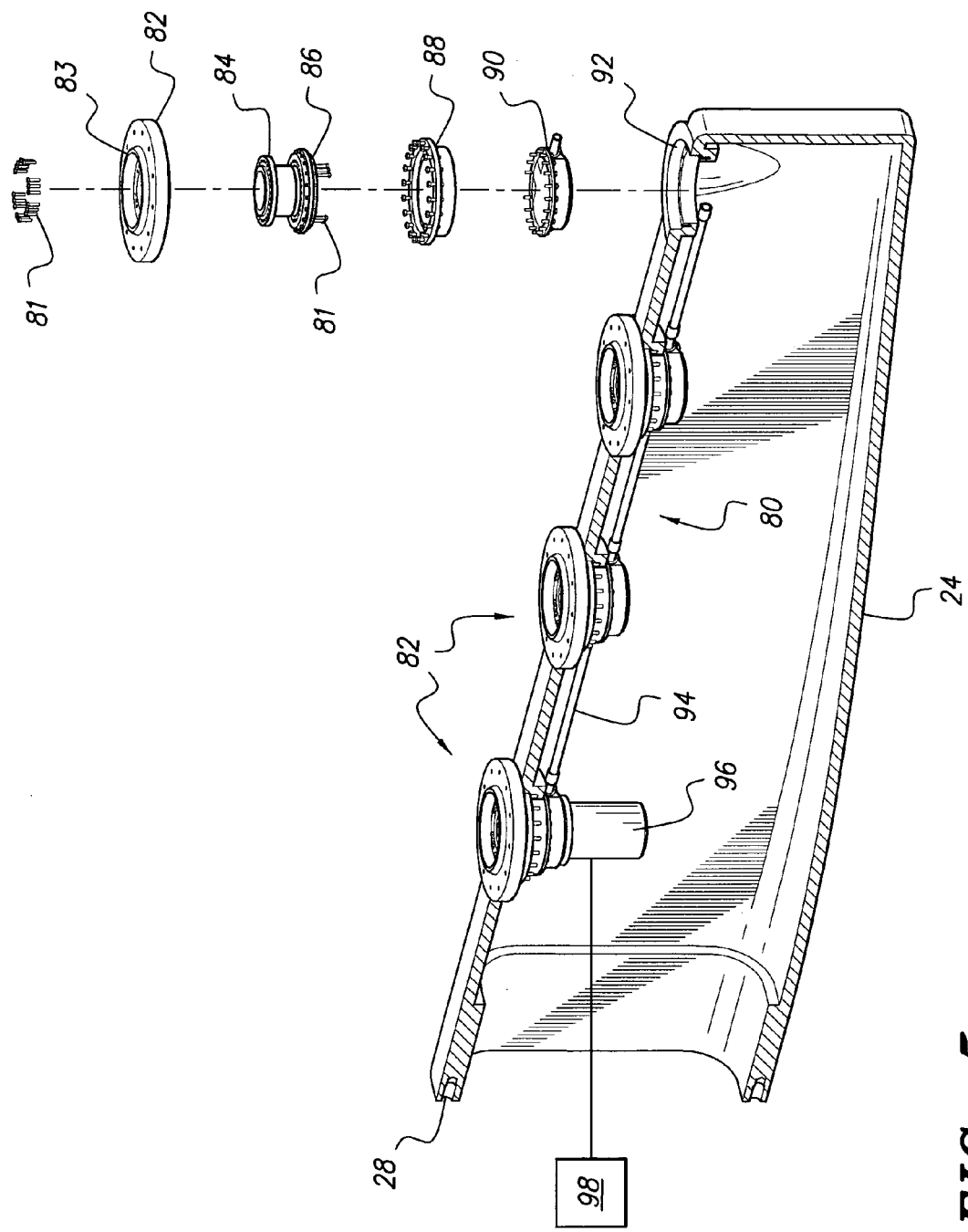
FIG. 5 is a partial perspective view in section of a lower mounting arm in the vertical windmill according to the present invention.
Figure 6:
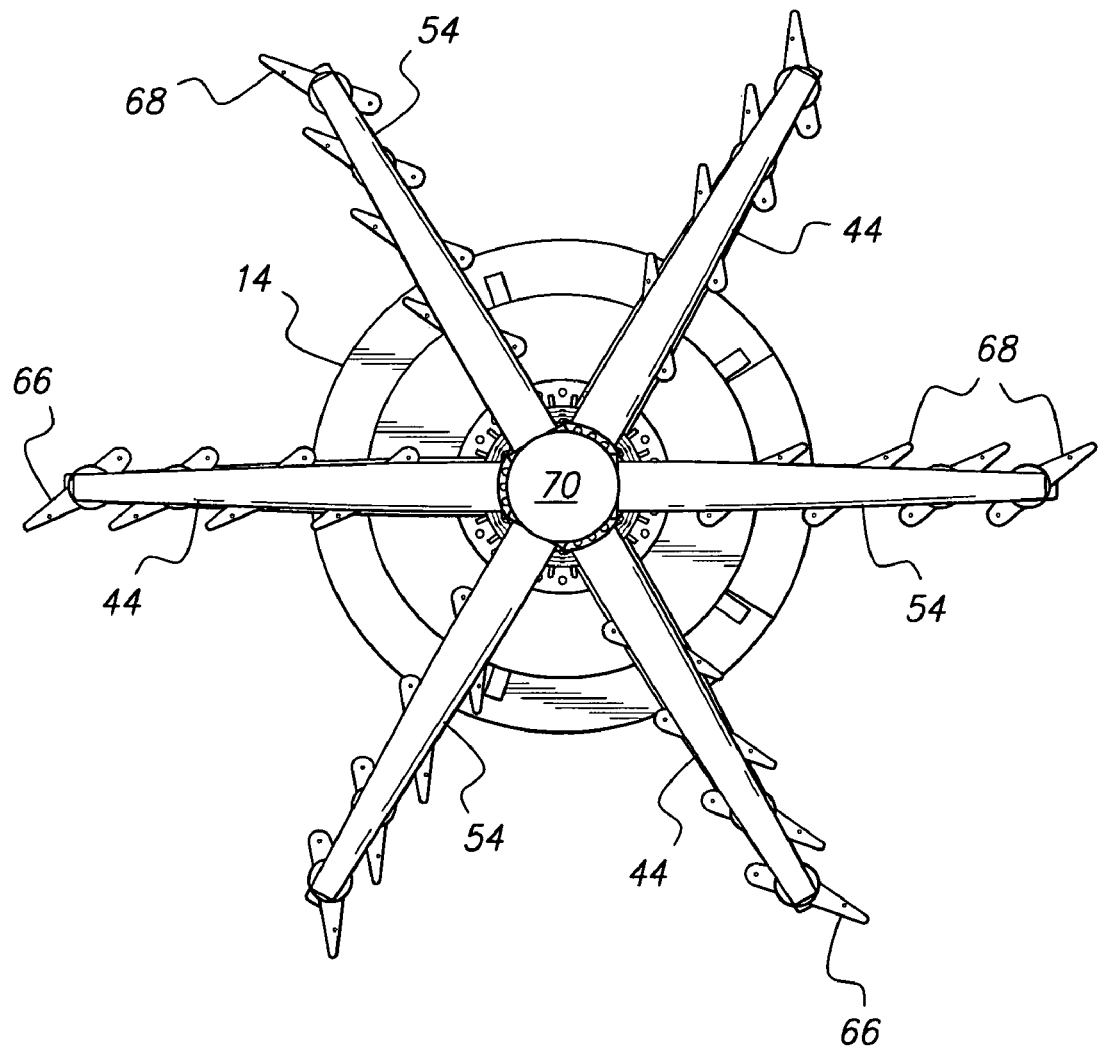
FIG. 6 is a top view of the vertical windmill according to the present invention.

Turning to FIGS. 3-5, the following describes how the blades 60 are mounted to the upper and lower arms. Since the mounting is similar for both wind wheels, the following description focuses on the mounting between the first (lower) mounting arm 24 and the third (upper) mounting arm 44 with the understanding that the description applies to the other mounting arms 34, 54.

Since weight has an ultimate negative impact on maximizing any given wind power, the arms 24, 44 are preferably hollow structures with both flat and curved sides to respectively maximize surface area and aerodynamics. As shown in FIG. 4, the hollow, upper arm 44 includes mounting holes 48 adapted for mounting the arm 44 to the respective mounting hole 42 and depending mounting assemblies 46. As shown in FIG. 5, the hollow, lower arm 24 includes mounting holes 28 and upwardly extending mounting assemblies 82. In the exemplary embodiment, both upper and lower mounting assemblies 46, 82 are preferably rotatable male adapters which fit into female adapters 62, 64 in the blades 60.

An example of an arm or male mounting assembly is shown in FIG. 5. The mounting assembly includes a male adapter 82 having a raised, annular mounting flange 83. The flange 83 includes a beveled edge to facilitate self-aligned installation thereof into a respective female adapter 62, 64. The male adapter 82 directly mounts to a connector 84 mounted on a rotary bearing 86. The bearing 86 is housed in a bearing housing 88, which in turn is seated in a mounting assembly seat 92. The whole mounting assembly may be connected via fasteners 81. Thus, it can be seen that once assembled, the blades 60 are free to rotate or pivot and advantageously orient themselves to accommodate ever-changing wind conditions. However, depending on the size of the blades 60, the range of orientation should be limited so that they do not interfere with airflow between the blades 60.

As an alternative to the above, the vertical windmill 10 may include a positive means for angularly orienting the blades 60. As shown in FIG. 5, the lower mounting arm 24 includes an angle setting assembly 80. The angle setting assembly 80 includes a rotatable gear box 90 disposed on each mounting assembly 82. A rotatable transmission shaft 94 is connected to each rotatable gear box 90 such that rotation of the shaft 94 causes concerted rotation of the mounting assemblies 82. To facilitate transfer of rotation directions, the gear box 90 may include worm gears or similar gearing. A controller 98 selectively actuates a reversible motor 96 mounted to one of the mounting assemblies 82, which in turn rotates the connected gear box 90 and the shaft 94. Thus, activation of the motor 96 via the controller 98 positively rotates or pivots the mounted blades 60 to optimize and compensate for the strength and direction of the wind. It is to be understood that the angle setting assembly 80 may be disposed on either or both of the arms 24, 44.

In light of the above, it can be seen that the vertical windmill 10, for a given wind condition, maximizes rotation of the wind wheel column 12. The staggered and stacked arrangement of the wind wheels results in a relatively small configuration compared to the conventional taller and larger windmills. Moreover, the number of blades 60 that can be mounted thereon provides a relatively large surface area for wind to act upon while the self-orienting or positive orienting mechanisms ensures optimum utilization of wind conditions. The vertical windmill 10 is also more efficient in using the wind power because the hollow structural elements as well as the materials used therein substantially minimize weight.

It is to be understood that the vertical windmill 10 encompasses a wide variety of alternatives. For example, it is preferable that the hubs and the mounting arms are made from aluminum or other strong lightweight material. While the exemplary embodiments disclose a certain number of mounting arms and blades, these numbers can be varied depending on the size requirements and the desired efficiency. With respect to the blades 60, the profile can be varied to increase efficiency and aerodynamics. In addition, other types of rotatable mounting assemblies may be used to mount the blades 60 to the corresponding arms, e.g., locking ball and socket joints, snap fit mounts, ratcheting mechanisms, etc.

It is to be understood that the present invention is not limited to the embodiments described above, but encompasses any and all embodiments within the scope of the following claims.

I claim:

1. A vertical windmill, comprising:
    a base;
    a rotatable vertical wind wheel column mounted to the base, the vertical wind wheel column having a vertical axis of rotation, the vertical wind wheel column having;
    at least two wind wheels rotatable about the wheel column axis, each wind wheel having a plurality of radially spaced mounting arms extending from the axis; and
    an array of vertically oriented and pivotal blades mounted between spaced pairs of mounting arms, each of the blades having a height;
    wherein the wind wheels are vertically stacked so that the mounting arms of one of the wind wheels are radially staggered from the mounting arms of the next succeeding wind wheel and the height of the blades in successive wind wheels overlap.

2. A vertical windmill, comprising:
    a base;
    a plurality of stacked hubs vertically mounted to the base, the stack of hubs being rotatable about a vertical axis;
    a plurality of mounting arms radially extending from each hub at angularly spaced intervals, the mounting arms of alternate stacked hubs being vertically aligned with each other to define a pair of upper and lower mounting arms; and
    a plurality of vertically oriented and pivotal blades mounted between each pair of upper and lower mounting arms, each of the blades having a height.

3. The vertical windmill according to claim 2, wherein each said hub is an elongate, substantially cylindrical tube having a plurality of angularly spaced mounting holes, the mounting arms being attached to the tube at the mounting holes, each said hub also having top and bottom mounting flanges.

4. The vertical windmill according to claim 3, wherein the plurality of stacked hubs comprises first, second, third and fourth hubs consecutively stacked atop each other.

5. The vertical windmill according to claim 4, wherein the first and third hubs, the plurality of mounting arms extending from the first and third hubs, and the plurality of blades extending between the mounting arms of the first hub and the mounting arms of the third hub define a first wind wheel.

6. The vertical windmill according to claim 5, wherein the second and fourth hubs, the plurality of mounting arms extending from the second and fourth hubs, and the plurality of blades extending between the mounting arms of the second hub and the mounting arms of the fourth hub define a second wind wheel.

7. The vertical windmill according to claim 2, wherein each said pair of mounting arms includes a plurality of pivotal mounting assemblies for top and bottom ends of the respective plurality of blades to permit angular orientation of the blades.

8. The vertical windmill according to claim 7, wherein each said pivotal mounting assembly comprises a male adapter.

9. The vertical windmill according to claim 8, wherein each said blade includes upper and lower mounting assemblies.

10. The vertical windmill according to claim 9, wherein the upper and lower mounting assemblies comprise female adapters.

11. The vertical windmill according to claim 7, further comprising an angle setting assembly for positively orienting the blades at a desired angle, the angle setting assembly being operatively connected to one of the plurality of pivotal mounting assemblies.

12. The vertical windmill according to claim 11, wherein the angle setting assembly comprises:
    a rotary gear box attached to each said mounting assembly;
    a transmission shaft interconnected to each of the rotary gear boxes;
    a reversible motor operatively disposed on one of said mounting assemblies; and
    a controller for selectively actuating the motor;
    wherein actuation of the motor rotates the transmission shaft, thereby causing concerted rotation of the rotary gear boxes in order to pivot the plurality of blades into the desired angular orientation.

13. The vertical windmill according to claim 2, wherein each of the blades comprises an elongate wing foil having a straight side, an opposite curved side, a top end, and a bottom end, the top and bottom ends each having a mounting assembly for attaching the blade to the upper and lower mounting arms, respectively.

14. The vertical windmill according to claim 2, further comprising a plurality of mounting brackets, each of the blades being an elongate, substantially flat wing foil disposed between a pair of the mounting brackets, the mounting brackets attaching the blade to a pair of the upper and lower mounting arms.

15. The vertical windmill according to claim 2, further comprising a cap mounted atop an uppermost one of said hubs.

* * * * *